(12) United States Patent
Rogunova et al.

(10) Patent No.: US 8,691,895 B2
(45) Date of Patent: *Apr. 8, 2014

(54) FLAME RETARDANT, OPTICALLY CLEAR THERMOPLASTIC MOLDING COMPOSITION

(75) Inventors: Marina Rogunova, Pittsburgh, PA (US); Nicolas Sunderland, Venetia, PA (US); Gerald A. Dibattista, McDonald, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/215,789

(22) Filed: Jun. 30, 2008

(65) Prior Publication Data

US 2009/0326129 A1    Dec. 31, 2009

(51) Int. Cl.
*C08L 69/00*    (2006.01)

(52) U.S. Cl.
USPC ............................ 524/115; 524/418

(58) Field of Classification Search
USPC ........................................ 524/115
See application file for complete search history.

(56) References Cited

U.S. PATENT DOCUMENTS

| | | |
|---|---|---|
| 3,334,154 A | 8/1967 | Kim |
| 3,382,207 A | 5/1968 | Jaquiss |
| 3,647,747 A | 3/1972 | Bialous |
| 3,733,295 A | 5/1973 | Martin et al. |
| 3,751,400 A | 8/1973 | Crennan et al. |
| 3,775,367 A | 11/1973 | Nouvertne |
| 3,933,734 A | 1/1976 | Mark et al. |
| 3,948,851 A | 4/1976 | Mark |
| 4,220,583 A | 9/1980 | Mark |
| 4,469,833 A | 9/1984 | Mark |
| 4,552,911 A | 11/1985 | Cohnen et al. |
| 4,626,563 A | 12/1986 | Ogoe et al. |
| 4,649,168 A | 3/1987 | Kress et al. |
| 4,918,125 A * | 4/1990 | Boutni ......................... 524/165 |
| 5,204,394 A * | 4/1993 | Gosens et al. ................ 524/125 |
| 5,478,874 A | 12/1995 | Miyouga et al. |
| 6,140,399 A | 10/2000 | Munro |
| 6,231,965 B1 | 5/2001 | Takemura et al. |
| 6,593,404 B1 | 7/2003 | Shin et al. |
| 6,740,697 B1 * | 5/2004 | Brenner et al. ............... 524/166 |
| 6,844,417 B1 * | 1/2005 | Chisholm et al. ............. 528/198 |
| 2007/0191519 A1 | 8/2007 | Jiao et al. |

FOREIGN PATENT DOCUMENTS

| | | |
|---|---|---|
| JP | 2002194193 A | 7/2002 |
| JP | 2004083901 A | 3/2004 |
| JP | 2005112974 A | 4/2005 |
| JP | 2007031583 A | 2/2007 |
| WO | 2009020575 A1 | 2/2009 |

* cited by examiner

*Primary Examiner* — Doris Lee
(74) *Attorney, Agent, or Firm* — John E. Mrozinski, Jr.

(57) ABSTRACT

A flame-retardant, optically clear thermoplastic molding composition is disclosed. The composition contains aromatic polycarbonate resin, a bromine-substituted carbonate oligomer, a phosphorous containing compound and an inorganic salt of perfluoroalkane sulfonic acid in amounts effective to impart to the composition flame resistance that in accordance with UL-94-5V standard is rated A at 3.00 mm and V-0 at 1.5 mm.

7 Claims, No Drawings

FLAME RETARDANT, OPTICALLY CLEAR THERMOPLASTIC MOLDING COMPOSITION

FIELD OF THE INVENTION

The invention relates to thermoplastic molding compositions and in particular to flame retardant polycarbonate compositions.

TECHNICAL BACKGROUND OF THE INVENTION

Since its introduction to the market in 1962, aromatic polycarbonate has become well known and accepted as a thermoplastic resin suitable for a wide variety of uses including injection molding, extrusion and film formation. The chemistry, synthesis, properties and applications of these polycarbonates are extensively discussed in Chemistry and Physics of Polycarbonates by Schnell, Interscience, 1964 and Polycarbonates by Christopher and Fox, Reinhold, 1962. Although polycarbonates have some inherent flame resistance, being self-extinguishing, ever more demanding requirements of flame-resistance have spawned numerous attempts to increase this property. Two general approaches have been followed. One approach has been to add substantial amounts of halogen, particularly bromine or chlorine, to polycarbonate compositions. The halogen can be carried by polycarbonate polymer chains as in U.S. Pat. Nos. 3,751,400 and 3,334,154 or by a monomeric compound as in U.S. Pat. No. 3,382,207.

However, the presence of substantial amounts of halogen has been found to be detrimental to the properties of the polycarbonate and numerous additives such as those proposed in U.S. Pat. Nos. 3,647,747 and 3,733,295 have been proposed to overcome these detrimental effects. The usage of any of a variety of salts—notably perfluoroalkane sulfonate salts of alkali metal or alkaline earth metal—with and without PTFE as a flame retardant for polycarbonate has been disclosed in U.S. Pat. Nos. 3,775,367; 4,469,833; 4,626,563; 4,626,563; and 4,649,168.

Alkali metal salts of sulfonic acids were disclosed in U.S. Pat. No. 4,469,833 to be flame retardant additives in the context of polycarbonate compositions containing structural units derived from thiodiphenol. U.S. Pat. No. 4,220,583 disclosed flame retardant polycarbonate compositions containing partially fluorinated polyolefin and organic salts of alkali metal or alkaline earth metals. U.S. Pat. No. 3,933,734 disclosed a flame retardant polycarbonate composition comprising metal salts of monomeric and/or polymeric aromatic sulfonic acids. U.S. Pat. No. 3,948,851 disclosed a flame retardant polycarbonate composition comprising metal salts of monomeric and/or polymeric aromatic sulfonesulfonic acids. Flame-retardant, translucent polycarbonate compositions containing partially fluorinated polyolefin, and an organic alkali (or alkaline earth) metal salt were disclosed in U.S. Pat. No. 4,220,583.

Experience has shown that polycarbonate compositions that are imparted flame resistance by the incorporation of sulfonate salts of alkali or alkaline earth metals and fluorinated polyolefin often exhibit an undesirable degree of haze, especially in thick molded articles. This deficiency restricts the amount of flame retardant that may thus be incorporated if optically clear products are desired.

SUMMARY OF THE INVENTION

A flame-retardant, optically clear thermoplastic molding composition is disclosed. The composition contains aromatic polycarbonate resin, a bromine-substituted carbonate oligomer, a phosphorous containing compound and an inorganic salt of perfluoroalkane sulfonic acid in amounts effective to impart to the composition flame resistance that in accordance with UL-94 standard is rated 5VA at 3.00 mm and V-0 at 1.5 mm.

DETAILED DESCRIPTION OF THE INVENTION

The inventive composition that features exceptional flame retardance and impact strength contains
- A) 50 to 99 percent by weight (pbw), preferably 70 to 90 pbw, most preferably 80 to 85 pbw of aromatic polycarbonate,
- B) 1 to 20 preferably 5 to 15, more preferably 8 to 12 pbw of bromine-substituted oligocarbonate,
- C) 1 to 20, preferably 2 to 10, particularly preferably 3 to 7, pbw of a phosphorus-containing compound, preferably organic phosphoric or phosphonic acid ester, and
- D) 0.01 to 1, preferably 0.02 to 0.5, most preferably 0.04 to 0.1 pbw of at least one alkali or alkaline-earth salt of perfluoroalkane sulfonic acid.

Any numerical range recited herein is intended to include all sub-ranges subsumed therein.

Component A

Suitable thermoplastic aromatic polycarbonate resins for preparing the composition of the present invention are homopolycarbonates and copolycarbonates (including polyestercarbonates) both linear or branched resins and mixtures thereof.

These (herein polycarbonates) generally have a weight average molecular weight of 10,000 to 200,000, preferably 20,000 to 80,000 (measured by gel permeation chromatography) and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference). Such polycarbonates are known and widely available in commerce, for instance as products of Bayer MaterialScience under the trademark Makrolon®.

Aromatic dihydroxy compounds suitable for the preparation of aromatic polycarbonates and/or aromatic polyester carbonates conform to formula (I)

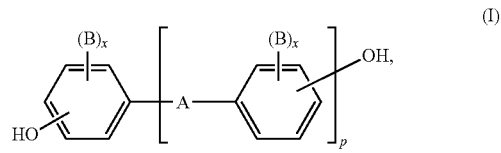

wherein
A represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which there may be condensed other aromatic rings optionally containing hetero atoms, or a radical conforming to formula (II) or (III)

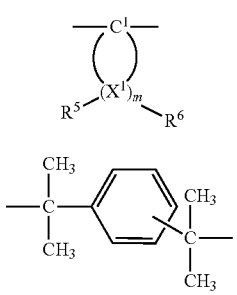

The substituents B independently one of the others denote $C_1$- to $C_{12}$-alkyl, preferably methyl, x independently one of the others denote 0, 1 or 2, p represents 1 or 0, and $R^5$ and $R^6$ are selected individually for each $X^1$ and each independently of the other denote hydrogen or $C_1$- to $C_6$-alkyl, preferably hydrogen, methyl or ethyl, $X^1$ represents carbon, and m represents an integer of 4 to 7, preferably 4 or 5, with the proviso that on at least one atom $X^1$, $R^5$ and $R^6$ are both alkyl groups.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)ethers, bis-(hydroxyphenyl) sulfoxides, bis-(hydroxyphenyl) ketones, bis-(hydroxyphenyl)-sulfones and α,α-bis-(hydroxyphenyl)-diisopropylbenzenes. Particularly preferred aromatic dihydroxy compounds are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone. Special preference is given to 2,2-bis-(4-hydroxyphenyl)-propane (bisphenol A). These compounds may be used individually or in the form of any desired mixtures.

Chain terminators suitable for the preparation of polycarbonates include phenol, p-chlorophenol, p-tert.-butylphenol, as well as long-chained alkylphenols, such as 4-(1,3-tetramethylbutyl)-phenol or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally 0.5 to 10% based on the total molar amount of the aromatic dihydroxy compounds used.

The suitable polycarbonates include polyestercarbonates, including such as are disclosed in U.S. Pat. Nos. 4,334,053; 6,566,428 and in CA 1173998, all incorporated herein by reference. Aromatic dicarboxylic acid dihalides for the preparation of the suitable aromatic polyestercarbonates include diacid dichlorides of isophthalic acid, terephthalic acid, diphenyl ether 4,4'-dicarboxylic acid and naphthalene-2,6-dicarboxylic acid. Particularly preferred are mixtures of diacid dichlorides of isophthalic acid and terephthalic acid in a ratio of from 1:20 to 20:1.

The content of carbonate structural units in polyestercarbonates is preferably up to 100 mol. %, especially up to 80 mol. %, particularly preferably up to 50 mol. %, based on the sum of ester groups and carbonate groups. Both the esters and the carbonates contained in the aromatic polyester carbonates may be present in the polycondensation product in the form of blocks or in a randomly distributed manner.

Component B

The bromine substituted oligocarbonate of the invention preferably conforms structurally conforming to

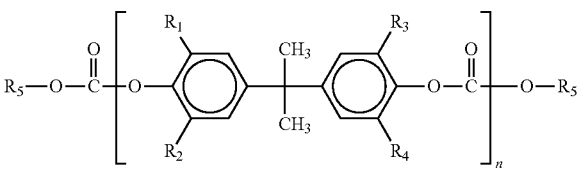

where $R_1$, $R_2$, $R_3$ and $R_4$ independently one of the others denote H, Br or $CH_3$ with the proviso that at least one of $R_1$, $R_2$, $R_3$, $R_4$ denotes Br, and where $R_5$ denotes an aryl, alkylaryl or alkyl radicals, preferably, phenyl, p-tert-butylphenyl, cumyl, nonyl or iso-nonyl radicals, and n is 1-100, preferably 2 to 50 and more preferably 3 to 5.

Most suitable is the oligocarbonate having bromine content greater than 40 percent, preferably 50 to 55 percent relative to its weight and conforming to

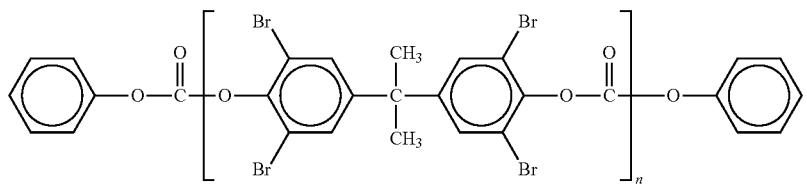

n = 3-5

Component C

Phosphorus-containing compounds suitable in the context of the invention include oligomeric organic phosphoric or phosphonic acid esters conforming structurally to formula (IV)

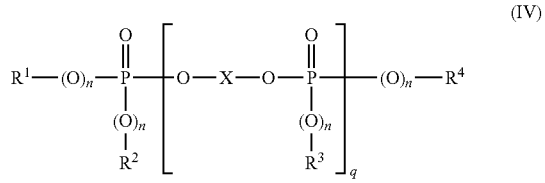

wherein $R^1$, $R^2$, $R^3$ and $R^4$ independently one of the others, each represents $C_1$- to $C_8$-alkyl, or $C_{5-6}$-cycloalkyl, $C_{6-20}$-aryl or $C_{7-12}$-aralkyl each optionally substituted by alkyl, preferably by $C_{1-4}$-alkyl, n independently one of the others denotes 0 or 1, preferably 1,
q denotes 0.5 to 30, preferably 0.8 to 15, particularly preferably 1 to 5, especially 1 to 2, and
X is a mono- or poly-nuclear aromatic radical having from 6 to 30 carbon atoms, or an aliphatic radical having from 2 to 30 carbon atoms, which may be OH-substituted and may contain up to 8 ether bonds. The aliphatic radical may be linear or branched.

Preferably, $R^1$, $R^2$, $R^3$ and $R^4$ each independently of the others represents $C_{1-4}$-alkyl, phenyl, naphthyl or phenyl-$C_{1-4}$-alkyl. In the embodiments where any of $R^1$, $R^2$, $R^3$ and $R^4$ is aromatic, it may be substituted by alkyl groups, preferably by $C_{1-4}$-alkyl. Particularly preferred aryl radicals are cresyl, phenyl, xylenyl, propylphenyl or butylphenyl.

In the preferred embodiment X represents a mono- or poly-nuclear aromatic radical having from 6 to 30 carbon atoms. It is preferably derived from any of the aromatic dihydroxy compounds of formula (I).

X particularly preferably represents at least one member selected from the group consisting of

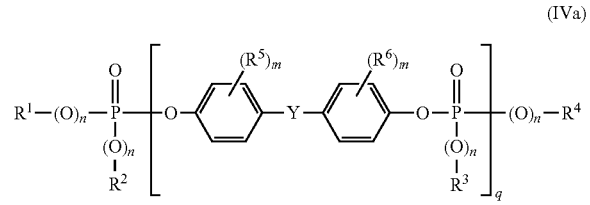

Especially, X may be derived from resorcinol, hydroquinone, bisphenol A or diphenylphenol and particularly preferably from bisphenol A.

Further suitable phosphorus-containing compounds are compounds of formula (IVa)

(IVa)

$$R^1-(O)_n-\overset{\overset{O}{\|}}{\underset{\underset{R^2}{|}}{P}}-\left[O-\underset{(R^5)_m}{\bigcirc}-Y-\underset{(R^6)_m}{\bigcirc}-O-\overset{\overset{O}{\|}}{\underset{\underset{R^3}{|}}{P}}-(O)_n-R^4\right]_q$$

wherein
$R^1$, $R^2$, $R^3$, $R^4$, n and q are as defined for formula (IV),
m independently one of the others represents 0, 1, 2, 3 or 4,
$R^5$ and $R^6$ independently one of the others represents $C_{1-4}$-alkyl, preferably methyl or ethyl, and
Y represents $C_1$- to $C_7$-alkylidene, $C_{1-7}$-alkylene, $C_{5-12}$-cycloalkylene, $C_{5-12}$-cycloalkylidene, —O—, —S—, —SO$_2$ or —CO—, preferably isopropylidene or methylene.
Particularly preferred is

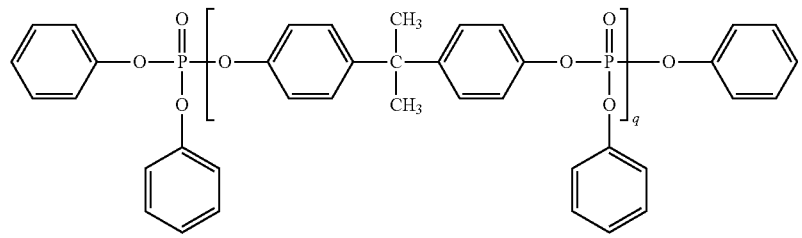

wherein q is 1 to 2.

Such phosphorus compounds are known (see, for example, U.S. Pat. Nos. 5,204,394 and 5,672,645, both incorporated herein by reference) or may be prepared by known methods (e.g. Ullmanns Enzyklopädie der technischen Chemie, Vol. 18, p. 301 et seq. 1979; Houben-Weyl, Methoden der organischen Chemie, Vol. 12/1, p. 43; Beilstein Vol. 6, p. 177).

Component D

The inorganic salt suitable in the context of the inventive composition is alkali or alkaline-earth salt of perfluoroalkane sulfonic acid. Examples of such salt include sodium and potassium perfluorobutane sulfonate, sodium and potassium perfluoromethylbutane sulfonate, sodium and potassium perfluorooctane sulfonate, sodium and potassium perfluoromethane sulfonate, sodium and potassium perfluoroethane sulfonate, sodium and potassium perfluoropropane sulfonate, sodium and potassium perfluorohexane sulfonate, sodium and potassium perfluoroheptane sulfonate, tetraethylammonium perfluorobutane sulfonate, tetraethylammonium perfluoromethylbutane sulfonate and the like and mixtures thereof.

Non-limiting examples of suitable sulfonic acid salts are perfluoroalkane sulfonate alkali metal, perfluoroalkane sulfonate alkaline earth metal, $C_{1-6}$-alkylammonium, or ammonium salts. Such salts are described in the above-mentioned U.S. Pat. No. 3,775,367, and include, for example, salts such as sodium, potassium, or tetraethyl ammonium perfluoromethylbutane sulphonate; sodium, potassium, or tetraethyl ammonium perfluoromethane sulphonate; sodium, potassium, or tetraethyl ammonium perfluoroethane sulphonate; sodium, potassium, or tetraethyl ammonium perfluoropropane sulphonate; sodium, potassium, or tetraethyl ammonium perfluorohexane sulphonate; sodium, potassium, or tetraethyl ammonium perfluoroheptane sulphonate; sodium, potassium, or tetraethyl ammonium perfluoroctanesulphonate; sodium, potassium, or tetraethyl ammonium perfluorobutane sulfonate; and sodium, potassium, or tetraethyl ammonium diphenylsulfone-sulphonate; and mixtures comprising at least one of the foregoing salts. Potassium perfluorobutane sulfonate (KPFBS) and potassium diphenylsulfon-3-sulphonate (KSS) are particularly preferred.

Such sulfonates or mixtures thereof may be added to the polycarbonate during its preparation or they may be added to the melt of the finished polycarbonate by homogenization using an extruder, for example, or by any other suitable means which will insure a thorough distribution in the polycarbonate resin. Some such suitable methods are described, for example, in U.S. Pat. No. 3,509,091, incorporated herein by reference.

Other Components

The inventive composition may further include effective amounts of any of the additives known for their function in the context of thermoplastic polycarbonate molding compositions. These include any one or more of lubricants, mold release agents, for example pentaerythritol tetrastearate, nucleating agents, antistatic agents, antioxidants, thermal stabilizers, light stabilizers, hydrolytic stabilizers, fillers and reinforcing agents, colorants or pigments, as well as further flame retarding agents, other drip suppressants or flame retarding synergists. Such stabilizer additives are known in the art and are disclosed in standard reference works such as "Plastics Additives Handbook", 5th edition, edited by H. Zweifel, Hanser Publishers incorporated herein by reference. The additives may be used in effective amounts, preferably of from 0.01 to a total of about 30% relative to the total weight of the polycarbonate component.

The inventive composition may be produced by conventional procedures using conventional equipment. It may be used to produce moldings of any kind by thermoplastic processes such as injection molding, extrusion and blow molding methods. The Examples which follow are illustrative of the invention.

EXAMPLES

In the preparation of exemplified compositions, the components and additives were melt compounded in a twin screw extruder ZSK 30 at a temperature profile of 300 to 400° C. The pellets obtained were dried in a forced air convection oven at 120° C. for 4 to 6 hours. The test specimens were prepared by injection molding.

In preparing the compositions shown below the following components were used:

Polycarbonate: a bisphenol-A based linear homopolycarbonate having melt flow rate of about 4 g/10 min (at 300° C., 1.2 kg) per ASTM D 1238 (Makrolon 3208, a product of Bayer MaterialScience LLC)

Bromine-substituted oligocarbonate (designated in the table as Br—OC): Tetra-brominated oligocarbonate based on bisphenol-A conforming to

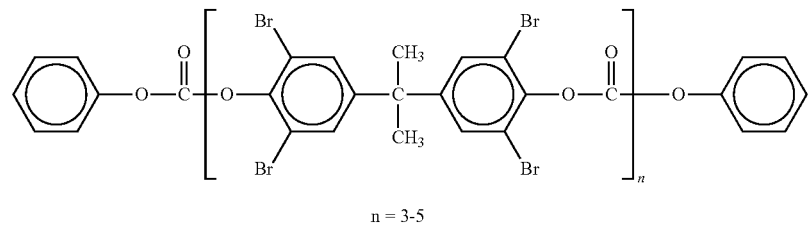

n = 3-5 a product of Chemtura Corporation.

Phosphorous compound (designated P-compound): conforming to

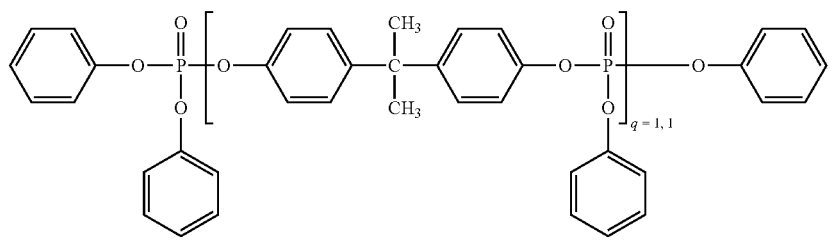

a product of Great Lakes Chemical.

Potassium Perfluorobutane Sulfonate, a product of Lanxess AG.

Fluorinated polyolefin: co-precipitated PTFE and SAN (50/50 wt. %).

The balance, to 100 wt %, of each of the exemplified compositions was made up of conventional thermal stabilizers and lubricant having no criticality in the context of the invention.

The melt flow rates (MFR) of the compositions were determined in accordance with ASTM D-1238 at 300° C., 2.16 Kg load.

Multi axial Impact strength was determined at room temperature in accordance with ASTM D3763 using specimens ⅛".

The flammability rating was determined according to UL-94V and UL94 5V protocols.

TABLE 1

|  | Example | | | |
|---|---|---|---|---|
|  | 1 | 2 | 3 | 4 |
| Polycarbonate, wt % | 94.4 | 89.4 | 84.4 | 84.4 |
| Sulfonate salt, wt, % | 0.05 | 0.05 | 0.05 | 0.05 |
| P-compound, wt. % | 5 | 0 | 5 | 5 |
| Br-OC | 0.0 | 10 | 10 | 10 |
| PTFE | 0.013 | 0.013 | 0.013 | 0.0 |
| Physical Properties | | | | |
| Melt Flow, cm³/10 min. | 8.8 | 6.1 | 9.2 | 9.7 |
| Optical properties | | | | |
| Haze, % | 4.43 | 11.3 | 11.7 | 0.79 |
| Transparency, % | 88 | 86.1 | 85.6 | 90.1 |
| Mechanical Properties | | | | |
| Multi-axial Impact, ft lbf | 52.4 | 49.8 | 51.2 | 48.0 |
| Flammability Rating | | | | |
| UL94-5V, bars 3 mm thickness | Fail | Fail | 5V-A | 5V-A |
| UL94-5V, plaques* 3 mm thickness | 5V-A | 5V-A | 5V-A | 5V-A |
| UL94-V 1.5 mm thickness | V-2 | V-0 | V-0 | V-0 |

*plaques dimensions were 6" × 6" × 3 mm.

Examples 4 represents the invention show a combination of exceptional flame resistance (combination of 5VA at 3.00 mm and V0 at 1.5 mm) and transparency (with haze value <1.0%). Examples 1, 2 and 3 are comparative examples exhibiting inferior properties.

What is claimed is:

1. A transparent thermoplastic molding composition free of fluorinated polyolefin, comprising
   A) 70 to 90 pbw of aromatic polycarbonate,
   B) 1 to 20 pbw of bromine-substituted oligocarbonate
   C) 1 to 20 pbw of a phosphorus-containing compound, and
   D) 0.01 to 1 pbw of at least one alkali or alkaline-earth or $C_{1-6}$-alkylammonium or ammonium salt of perfluoroalkane sulfonic acid or sodium diphenylsulfone-sulphonate or potassium diphenylsulfone-sulphonate or tetraethyl ammonium diphenylsulfone-sulphonate,
   wherein the molding composition has a haze value <1.0%.

2. The composition of claim 1 wherein said bromine substituted oligocarbonate is present in an amount of 5 to 15 pbw, said phosphorus-containing compound is present in an amount of 2 to 10 pbw and said salt is present in an amount of 0.02 to 0.5 pbw.

3. The composition of claim 1 wherein said bromine-substituted oligocarbonate conforms structurally to

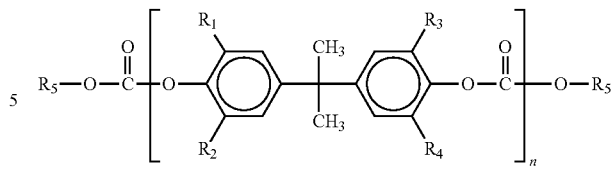

where $R_1, R_2, R_3$ and $R_4$ independently one of the others denote H, Br or $CH_3$ with the proviso that at least one of $R_1, R_2, R_3, R_4$ denotes Br, and where R5 denotes an aryl, alkylaryl or alkyl radicals, and n is 1-100.

4. The composition of claim 1 wherein said phosphorus-containing compound conforms structurally to

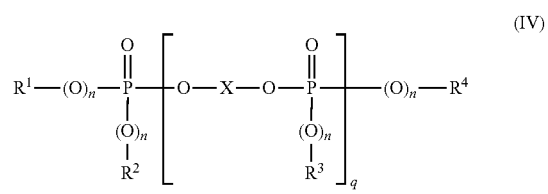

wherein $R^1$, $R^2$, $R^3$ and $R^4$ independently one of the others, each represents $C_1$- to $C_8$-alkyl, or $C_{5-6}$-cycloalkyl, $C_{6-20}$-aryl or $C_{7-12}$-aralkyl, n independently one of the others denotes 0 or 1 q denotes 0.5 to 30, and X is a mono- or poly-nuclear aromatic radical having from 6 to 30 carbon atoms, or an aliphatic radical having from 2 to 30 carbon atoms.

5. The composition of claim 1 wherein said salt of perfluoroalkane sulfonic acid is at least one perfluoroalkane sulfonate salt of a member selected from the group consisting of alkali metal, alkaline earth metal, $C_{1-6}$-alkylammonium, and ammonium.

6. The composition of claim 1 wherein the salt is at least one member selected from the group consisting of sodium perfluoromethylbutane sulphonate, potassium perfluoromethylbutane sulphonate, tetraethyl ammonium perfluoromethylbutane sulphonate, sodium perfluoromethane sulphonate, potassium perfluoromethane sulphonate, tetraethyl ammonium perfluoromethane sulphonate, sodium perfluoroethane sulphonate, potassium perfluoroethane sulphonate, tetraethyl ammonium perfluoroethane sulphonate, sodium perfluoropropane sulphonate, potassium perfluoropropane sulphonate, tetraethyl ammonium perfluoropropane sulphonate; sodium perfluorohexane sulphonate, potassium perfluorohexane sulphonate, tetraethyl ammonium perfluorohexane sulphonate, sodium perfluoroheptane sulphonate. potassium perfluoroheptane sulphonate, tetraethyl ammonium perfluoroheptane sulphonate, sodium perfluoroctanesulphonate, potassium perfluoroctane-sulphonate, tetraethyl ammonium perfluoroctanesulphonate, sodium perfluorobutane sulfonate, potassium perfluorobutane sulfonate, tetraethyl ammonium perfluorobutane sulfonate.

7. A transparent thermoplastic molding composition free of fluorinated polyolefin, comprising
   A) 70 to 90 pbw of aromatic polycarbonate,
   B) 1 to 20 pbw of bromine-substituted oligocarbonate conforming to

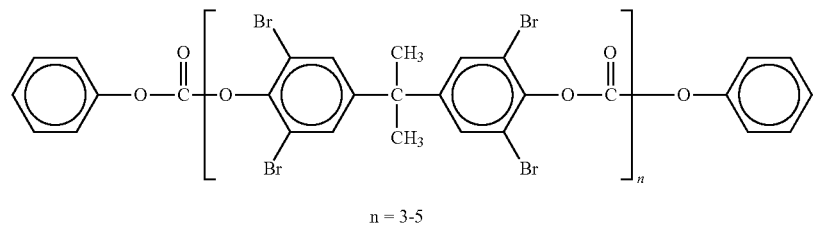
n = 3-5
having bromine content greater than 40 percent relative to its weight, and
C) 1 to 20 pbw of a phosphorus-containing compound conforming to
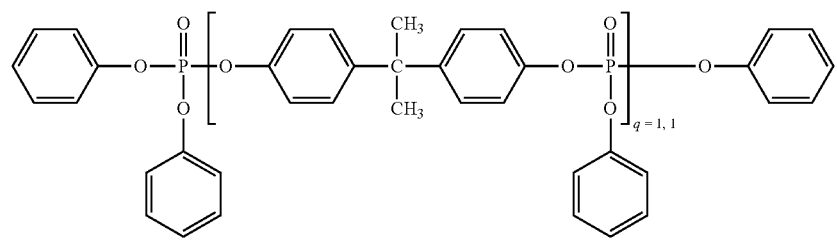
and
D) 0.01 to 1 pbw of Potassium Perfluorobutane Sulfonate, wherein the molding composition has a haze value <1.0%.
* * * * *